3,067,173
HALOGENATED POLYACETALS
Arthur L. Barney, Wilmington, Del., assignor to E. I. du Pont de Nemours and Company, Wilmington, Del., a corporation of Delaware
No Drawing. Filed Dec. 24, 1958, Ser. No. 782,663
24 Claims. (Cl. 260—63)

This invention relates to certain new polymeric polyacetals containing halogen end groups and has as its principal objects provision of these new polymeric compounds and of methods for their preparation.

The remarkable properties of polytetrafluorethylene have stimulated intensive interest in fluorine chemistry, and, as a result, much has been learned of the effect of the fluorine function, particularly in otherwise wholly-hydrocarbon compounds. Relatively less, however, is known of the effect of fluorine substitution in compounds containing reactive moieties, e.g., aldehyde, hydroxy, or carboxy groups. The successful polymerization of formaldehyde to a tough, thermally-stable polymer (U.S. 2,768,944) has again focused attention on fluorine-containing aldehydes and ketones, particularly on means for improving thermal stability and other physical properties.

It has now been found that the thermal stability of polymeric polyhaloacetals can be improved by replacing the end-hydroxyl groups with halogen. This invention thus provides new polymeric polyhaloacetals having improved thermal stability and methods for their preparation.

The process aspect of the present invention is accomplished very simply by contacting and reacting certain polymeric polyhaloacetals, described at length below, with suitable halogenating or end-capping agents, generally in admixture with an inert organic diluent medium. After halogenation is complete, the polymeric polyhaloacetal now containing halogen end groups may be recovered by methods known to those skilled in the art.

Neither temperature nor time is of critical importance in this reaction, although reflux at atmospheric pressure is convenient. Temperatures between the boiling point of the reaction medium and the decomposition temperature of the polymer being end-capped, e.g., up to about 200° C., are, however, usable. Reaction time at reflux will generally be from a few minutes up to 24 hours. Lower temperatures down to the freezing point of the diluent medium may be employed but, of course, lengthen the reaction period needed.

The reaction may be accomplished in bulk or, preferably, as noted, in an organic diluent. Suitable diluents are inert liquid organic reaction media such as ethers, e.g., diethyl ether, dipropyl ether, etc., halogenated hydrocarbons such as carbon tetrachloride, and the like. The amount of reaction medium employed can vary from about 1.5 to 1000 or more times the weight of the polymeric polyhaloacetal, depending upon whether a batch or continuous process is being carried out.

The agents now employed to end-cap polymeric polyhaloacetals are those capable of replacing the hydroxyl group by halogen of atomic number 9 to 35. In general, these reagents are inorganic halides which form with acetic acid acetyl halide or a 1,1,1-trihaloethane. Examples are the phosphorus halides, such as phosphorus oxychloride, phosphorus trichloride, and pentachloride, phosphorus tribromide and pentabromide; sulfur halides, such as sulfonyl chloride, sulfuryl chloride, sulfur tetrafluoride. Other suitable halogenating agents include the polyvalent metal halides known to be useful as Friedel-Crafts catalysts, e.g., aluminum chloride, ferric chloride, zinc chloride, aluminum bromide, boron trifluoride, etc.

The halogenating agent is employed in amount at least equivalent to the number of hydroxyls it is desired to replace, generally the number in the initial polymer.

The hydroxyl end group-containing polymeric polyhaloacetals treated in accord with this invention are those which conform to the general formula:

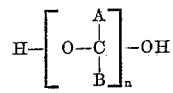

in which $n$ is a whole number integer greater than 6 and one of A and B may be hydrogen or lower alkyl, i.e., contains up to 8 carbons, and the other, or both individually, may be perfluorocarbon, $\omega$-hydropolyfluorocarbon, or $\beta$-alkoxypoly halofluorocarbon groups wherein the halogen is of atomic number 9 to 35 and the polyfluorocarbon group is up to 8 carbon atoms, or A and B together may form a perfluoroalkylene group. The preferred classes of polyhaloacetal polymers containing hydroxyl end groups are those in which one of A and B may be hydrogen and those where A and B together may be perfluoroalkylene preferably of not more than 6 carbon atoms.

It will be noted that the general formula above may also be written as

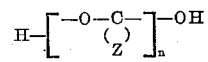

wherein Z symbolizes the sum of A and B and $n$ has its previously-defined meaning.

From the foregoing discussion, it will be evident that the halogen end group-containing polymeric polyhaloacetals, i.e., the product aspects of the invention, correspond to:

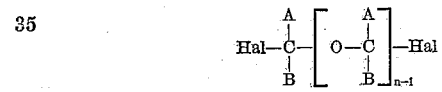

in which $n$, A and B have the aforementioned meanings.

The polymeric polyhaloacetals suitable as starting materials in the process of the invention fall generically into three groups, viz.: (1) those derived from monomeric $\beta$-alkoxypolyfluoroaldehydes and ketones described in U.S. Pat. 2,988,537, issued June 13, 1961; (2) those derived from $\omega$-hydropolyfluoroaldehydes known to the art; and (3) the polyacetals of perfluorocyclobutanone as described in U.S. Pat. 3,039,995, issued June 19, 1962. The preparations of these starting materials, and representative examples thereof, are as follows:

(1) Monomeric $\beta$-alkoxypolyfluoroketones and aldehydes may be prepared by reacting a gaseous fluoroolefin of the formula $CF_2=CX_2$, X being halogen of atomic number 9 to 35, with an alkali metal alkoxide and, respectively, a carboxylic acid ester or an N-dialkyl carboxamide at a temperature below 80° C., e.g., 15–60° C. The reaction mixture is eventually acidified, generally after gas absorption stops as indicated by a constant pressure, and the desired monomer recovered by methods obvious to those skilled in the art.

The monomeric $\beta$-alkoxypolyfluoroketones may be represented by the formula

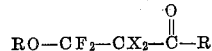

in which the X's are halogen of atomic number 9 to 35 and the R's are monovalent hydrocarbon or polyfluorohydrocarbon radicals of up to 12 carbons, and preferably of up to 7 or 8 carbons. Specific examples of $\beta$-alkoxypolyhaloketones preparable by the above-described process are 4-methoxy-3,3,4,4-tetrafluoro-2-butanone, $\beta$-methoxytetrafluoropropiophenone, bis[$\beta$-(1H,1H,5H-octafluoroamyloxy)tetrafluoroethyl]ketone, and the like.

The reaction involved in the preparation of the ketones may be exemplified as follows:

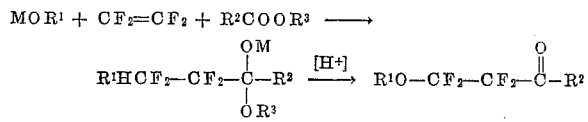

The various R's, of course, are suitable organic radicals and M is an alkali metal.

The monomeric β-alkoxypolyfluoroaldehydes may be represented by the formula

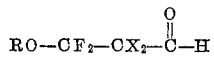

in which X and R have the aforementioned meanings. Specific β-alkoxypolyhaloaldehydes preparable as above are β-methoxytetrafluoropropionaldehyde, α-chloro-β-methoxy-α,β,β-trifluoropropionaldehyde, β-butoxytetrafluoropropionaldehyde, and the like.

Reactions involved in the preparation of the aldehydes may be illustrated as follows:

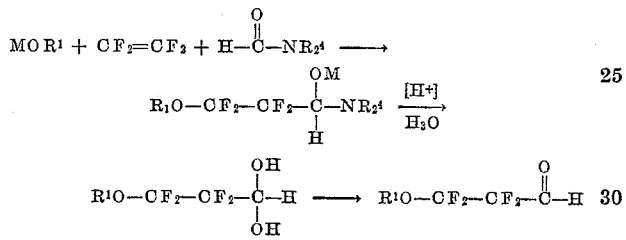

The β-alkoxypolyfluoroaldehydes and ketones are conveniently polymerized by contacting the polymerizable monomer, usually in an inert reaction medium, with an anionic initiator at a temperature which can be as low as −80° C. Polymer separates and is recovered by filtration or other method known to those skilled in the art.

Suitable exemplary anionic initiators are alkali metal cyanides and halides, e.g., potassium cyanide, cesium fluoride; alkali metal carboxylates, e.g., sodium acetate; quaternary ammonium compounds, e.g., tetraalkylammonium chloride and tetraethyl ammonium alkoxides; sulfonium salts, such as lauryl methyl phenyl sulfonium methyl-sulfate, triarylphosphines, e.g., triphenylphosphine, phosphites, e.g., triethyl phosphite; dimethylformamide, and the like.

Detailed preparation of monomers and polymers corresponding to the β-alkoxypolyfluoroaldehyde and ketone aspects of the invention will be found in Examples IV, V and VII below.

(2) Monomeric ω-hydropolyfluoroaldehydes polymerizable to the hydroxyl-containing polymers in turn end-capped according to this invention are readily made by the reduction, e.g., as with lithium aluminum hydride, of the corresponding ω-hydropolyfluorocarboxylic acids or esters. For example, difluoroacetaldehyde is obtained by the lithium aluminum hydride reduction of difluoroacetic acid or ester. Examples of other aldehydes are difluoroacetaldehyde, 3-hydroperfluoropropionaldehyde, 4-hydroperfluorobutyraldehyde, 5-hydroperfluoropentan-1-al, 7-hydroperfluoroheptan-1-al, 11-hydroperfluoroundecan-1-al, 9-hydroperfluorononan-1-al, and the like.

The preparation of monomeric ω-hydropolyfluoroaldehydes may be represented by the following equation:

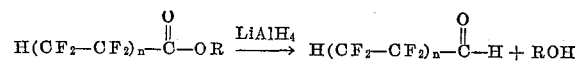

The hydroxyl-containing polymers are conveniently and easily made by contacting the polymerizable ω-hydropolyfluoroaldehyde monomer, usually in an inert reaction medium, with an anionic initiator of the type disclosed above at temperatures which can be as low as −80° C. The polymer is recovered by filtration or other methods known to those skilled in the art.

(3) Perfluorocyclobutanone, the percursor of the third type of polyacetals end-capped according to the present invention, may be prepared by the direct hydrolysis, under strongly acidic conditions, of the corresponding 1,2,2,3,3,4,4-heptafluoro-1-hydrocarbyloxycyclobutanes generally via a perfluorocyclobutanone hydrate as an intermediate. The heptafluorocyclobutyl ether hydrolyzed is itself prepared by the cycloaddition of tetrafluoroethylene and a perfluorovinyl hydrocarbon ether readily synthesized by reacting an alkali metal alkoxide with tetrafluoroethylene. The sequence of operations may be represented as follows:

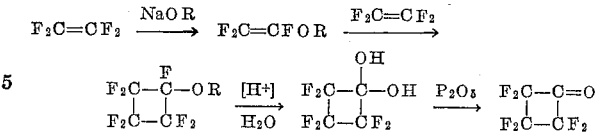

In these equations R represents a suitable organic radical, e.g., an alkyl radical of up to 8 carbons.

Perfluorocyclobutanone monomer may readily be polymerized at low temperatures, e.g., around −80° C., in the presence of an anionic initiator of the type described above and generally in an inert organic reaction medium.

The examples which follow illustrate but do not limit this invention.

EXAMPLE I

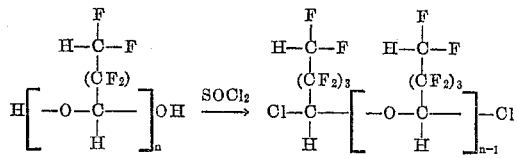

A mixture of 1.5 g. of ω-hydroperfluorovaleraldehyde polymer, 25 ml. of carbon tetrachloride, and 0.5 ml of thionyl chloride was heated under reflux for 16 hours. The mixture was cooled, the polymer was removed by filtration, washed with petroleum ether, and air-dried. The polymer thus obtained was pressed at 100° to 150° C. and 6000 lb./sq. in into clear, tough films which showed little deterioration on standing. These films are useful as wrapping and decorative foils.

The above experiment was repeated substituting 1 g. of phosphorus pentachloride for the 0.5 ml. of thionyl chloride. The product obtained was pressed at 150° C. and 6000 lb./sq. in. to clear, tough films which were thermally stable and useful as wrapping foils.

The ω-hydroperfluorovaleraldehyde polymer used in the above experiment was prepared as follows:

Samples of ω-hydrooctafluorovaleraldehyde were purified by gas chromatography on a 13′ x ¾″ column packed with silicone oil and firebrick and using helium as a carrier gas. Successive fractions of about 1 ml. in size were collected in a trap suitable for use in polymerization experiments. The aldehyde was cooled to −80° C. About 2 ml. of sodium-dried ether was introduced into the trap by means of a hypodermic syringe and when the reaction mixture had cooled to −80° C., one drop of triethyl phosphite (about 0.01 of a mole) was added. The sample was kept at −80° C. for 2–16 hours and the soluble polymer was worked up by precipitating in petroleum ether and collecting the product on a filter.

EXAMPLE II

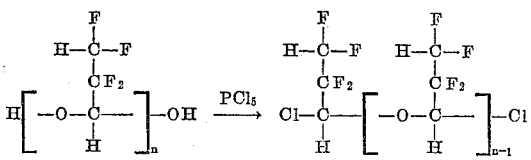

A mixture of 1.8 g. of ω-hydrotetrafluoropropionaldehyde polymer, 25 ml. of carbon tetrachloride, and 2 g. of phosphorus pentachloride was heated under reflux for 1.0 hour. The mixture was cooled, the polymer was removed by filtration, washed with petroleum, and air-dried.

The polymer thus obtained was pressed at 100° C. to 150° C. and 6000 lb./sq. in. pressure into clear, tough films which showed little deterioration on standing. These films are useful as protective foils.

The polymer used in the above experiment was prepared as follows:

About 1 gram of ω-hydrotetrafluoropropionaldehyde was purified by gas chromatography in a manner similar to that described in Example I. About 5 ml. of dry ether was distilled into the trap. The mixture was cooled to −80° C. and about 0.015 ml. DHT methoxide [1] solution in cyclohexane was added. The mixture was cooled at −80° C. overnight. Two drops of acetyl chloride were added to the reaction mixture and it was heated briefly to reflux. The reaction mixture was poured into petroleum ether and a small amount of polymer was collected by filtration. The polymer could be pressed into a clear film at 70° C. which is useful as a protective coating.

EXAMPLE III

Polydifluoroacetaldehyde, 1.7 g., 1.5 g. of phosphorus pentachloride, and 25 ml. of carbon tetrachloride were mixed in a round-bottomed flask and heated under reflux for 16 hours. The reaction mixture was cooled, the product separated by filtration, and washed with excess ether. When dried, it weighed 1.5 g. The polymer was a white elastomeric solid which could be pressed into films at room temperature. These films are useful as protective coatings and wrapping foils. The polymer is stable thermally, starting to decompose at about 240° C. and decomposing rapidly at 300° C. In contrast, uncapped polymer decomposes rapidly at 100–150° C.

The polymer used in the above experiment was made as follows:

Samples of difluoroacetaldehyde were prepared by reduction of ethyl difluoroacetate with lithium aluminum hydride in ether at −80° C. and purified by gas chromatography as described in Example I. 1.5 ml. of the resultant difluoroacetaldehyde, purified by gas chromatography, was diluted with 2 ml. of sodium-dried ether and the mixture cooled to −80° C. One drop of triethyl phosphite (about 0.05 cc.) was added and polymerization allowed to continue four hours. The reaction mixture was flooded with petroleum ether and coagulated polymer removed and washed with excess petroleum ether. After drying in air, it weighed 1.7 g.

EXAMPLE IV

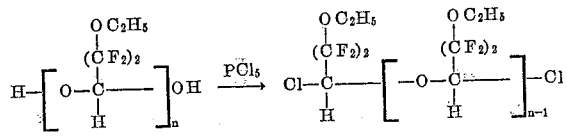

Poly-β-ethoxytetrafluoropropionaldehyde, 3.2 g., 50 ml. of carbon tetrachloride, and 2 g. of phosphorus pentachloride were heated under reflux for 16 hours. The mixture was cooled and the product was separated by filtration and dried. There was obtained 1.4 g. of a white, powdery solid which was pressed into clear film at 150° C. Thermal stability tests on a hot block showed it to be very stable up to about 250° C., at which temperature it began to decompose. The decomposition became quite rapid at 300° C. Polymer which had not been treated with phosphorus pentachloride decomposed rapidly at 150° C.

The phosphorus pentachloride treated polymer analyzed:

Analysis.—Calcd. for $C_5H_6F_4O_2$: C, 34.49; H, 3.48. Found: C, 34.35; H, 3.67; Cl, 0.37.

If it is assumed that each end of the polymer chain is capped by a chlorine atom, the above chlorine analysis indicates a polymer of molecular weight 20,000.

The polymer end-capped in this example was prepared as follows:

Step I.—Preparation of Monomeric β-Ethoxytetrafluoropropionaldehyde

A one-liter, four-necked flask, fitted with a condenser, stirrer, dropping funnel, and plug was charged with 24 g. of sodium hydride and 200 ml. of anhydrous ether. Absolute ethanol, 46 g., was added to the suspension during two hours and the mixture was stirred overnight. This reaction mixture was then stirred very fast for 30 minutes and the reflux condenser was connected to a manifold suitable for introduction of weighed amounts of tetrafluoroethylene. Dimethylformamide, 73 g., was added. The system was evacuated and flushed with tetrafluoroethylene three times and the run began. A total of one mole tetrafluoroethylene was added during one hour with careful cooling of the reaction mixture to keep the temperature between 30 and 35° C. The reaction mixture was flushed with air and then poured onto a mixture of 200 g. of concentrated hydrochloric acid and 500 g. of ice. The ether layer was separated and the water layer was extracted with three 250-ml. portions of ether. The ether extracts were combined and dried on magnesium sulfate. The ether was distilled and the residue was added to 150 g. of phosphorus pentoxide in the pot of a Vigreux still. The mixture was heated at 100° C. for 20 minutes and then the system was evacuated at 1 mm. pressure and the product collected in a solid carbon dioxide-cooled receiver. It weighed 43.7 g., which corresponds to a 25% yield of β-ethoxytetrafluoropropionaldehyde.

A small sample was purified by gas chromatography on a large silicone oil column at 155° C. It analyzed as follows:

Analysis.—Calcd. for $C_5H_6F_4O_2$: C, 34.49; H, 3.48; F, 43.65. Found: C, 34.29; H, 3.31; F, 42.75.

Nuclear magnetic resonance spectra for both proton and fluorine were in accord with the structure assigned.

Step II.—Preparation of Polymer

A 1.5 ml. sample of β-ethoxytetrafluoropropionaldehyde was purified by gas chromatography, diluted with 2 ml. of sodium-dried ether, and cooled to −80° C. One drop of a solution of DHT methoxide [2] in cyclohexane was added and polymerization was allowed to proceed for 16 hours. The product was flooded with petroleum ether and separated from the reaction mixture by filtration. The products from this experiment and another identical experiment were combined to yield 3.2 g. of polymer. The polymer was purified by washing with methanol for one hour at room temperature and dried.

EXAMPLE V

Poly-β-n-butoxytetrafluoropropionaldehyde, 1.25 g., 25 ml. of carbon tetrafluoride, and 1 g. of phosphorus pentachloride were heated under reflux for 1.5 hours. The reaction mixture was cooled, the product was separated by filtration, and purified by stirring with methanol for 30 minutes. It was again filtered and dried and weighed 1.0 g. This polymer could be pressed into a film at 150° C. This film adhered strongly to aluminum foil and was quite stable thermally, decomposing slowly at 220° C. This polymer before treatment with phosphorus pentachloride decomposed rapidly at 150° C.

The hydroxyl-containing polymer of this example was prepared as follows:

Step I.—Preparation of the Monomer

A one-liter, four-necked flask was fitted with a stirrer, condenser, nitrogen inlet, and dropping funnel and charged with 24 g. of sodium hydride and 200 ml. of anhydrous ether. n-Butanol, 74 g., was then added dropwise to the mixture during two hours. The reacted mixture was

---

[1] This is a quaternary ammonium methoxide containing two methyl groups and two long chain alkyl groups, one each or both being of $C_{16}$ or $C_{18}$ chain length.

[2] See Example II.

stirred at room temperature for 16 hours and then under reflux for 4–5 hours. The mixture was cooled and 73 g. dimethylformamide was added. The top of the reflux condenser was connected to a tetrafluoroethylene manifold system and after the system had been flushed with tetrafluoroethylene, stirring was begun and one mole of tetrafluoroethylene was added to the reaction mixture during 1.5 hours. The system was flushed with air and then poured onto a mixture of 200 g. of concentrated hydrochloric acid and 300 g. of ice. The ether layer was separated and the water layer was extracted with two 3-ml. portions of ether. The ether layers were combined and dried on magnesium sulfate. The ether was distilled and the residue, 116 g., was added to 150 g. of phosphorus pentoxide in a Vigreux still. The mixture was heated at 100° C. for 0.5 hour and the product was distilled under reduced pressure. A small sample was purified by gas chromatography and found to be pure.

*Analysis.*—Calcd. for $C_7H_{10}F_4O_2$: C, 41.58; H, 4.99; F, 37.60. Found: C, 41.87; H, 5.25; F, 37.52, 37.45.

This material was quite stable and could be distilled in a normal fashion, B.P. 62–63° C. at 50 mm. pressure. Gas chromatographic analysis showed that the product was contaminated slightly with n-butyltetrafluoroethyl ether so it was necessary to purify it by gas chromatography for polymerization experiments.

*Step. II.—Preparation of Poly-β-n-Butoxytetrafluoropropionaldehyde*

β-n-Butoxytetrafluoropropionaldehyde, 2.0 ml., was purified by gas chromatography and collected in a trap. Sodium-dried tetrahydrofuran, 2.0 ml., was added and the two drops of a solution of DHT methoxide [2] in cyclohexane. The mixture was cooled to −80° C. and the polymerization was allowed to continue for 16 hours. It was then warmed and the product separated by filtration and washed with petroleum ether; after being dried it weighed 1.25 g.

EXAMPLE VI

β-Methoxytetrafluoropropionaldehyde, which may be prepared in the same manner as the monomeric aldehyde of Example IV with substitution of methanol for ethanol, 1.5 ml., was purified by gas chromatography, collected in a trap, diluted with 1.5 ml. of sodium-dried ether, and cooled to −80° C. Two drops of a solution of DHT methoxide [2] in cyclohexane was added and the polymerization was allowed to run four hours. The reaction mixture was flooded with petroleum ether and the polymeric product separated by filtration and dried.

This product, 1.7 g., 25 ml. of carbon tetrachloride, 2 g. of phosphorus pentachloride were heated under reflux for one hour. The mixture was cooled and filtered. The product was separated and dried. It showed excellent thermal stability, decomposing rapidly only at temperatures of 300° C. or above. The uncapped polymer decomposed rapidly at 125° C. and instantaneously at 175° C.

EXAMPLE VII

α-Chloro-β-methoxy-α,β,β-trifluoropropionaldehyde, 2.0 ml., was purified by gas chromatography, collected in a trap and diluted with 2 ml. of sodium-dried ether. The mixture was cooled to −80° C. and one drop of pyridine was added. Polymerization was allowed to continue four hours. The mixture was then flooded with petroleum ether and the solid, partially coalesced polymer was removed. It was washed with petroleum ether, dried in air, and added to a mixture of 1.2 g. of phosphorus pentachloride in 25 ml. of carbon tetrachloride. The mixture was cooled, the product separated by filtration and dried. On a hot block the polymer appeared quite stable at 300° C., but decomposed quite rapidly at 320° C. Thermal stability analysis revealed that it lost 68% of its weight after 15 minutes at 300° C. Untreated polymer decomposed completely on a press at 175° C.

α-Chloro-β-methoxy-α,β,β-trifluoropropionaldehyde may be prepared as follows:

*Step I.—Preparation of Hydrate-Hemiacetal Mixture of α-Chloro-β-Methoxy-α,β,β-Trifluoropropionaldehyde*

A mixture of 27 g. (0.50 mole) of sodium methoxide, 45 g. (0.74 mole) of methyl formate, and 50 ml. of diethyl ether was prepared at 0° C. in a pressure vessel, which was then mounted on a shaker machine. After flushing the system five times by adding chlorotrifluoroethylene at 10 lb./sq. in. pressure and venting, chlorotrifluoroethylene was added while the reactor was being agitated and the temperature held at 10 to 12° C. Chlorotrifluoroethylene was added periodically. After seven hours, absorption of chlorotrifluoroethylene had essentially stopped. The system was then vented. The maximum controlled pressure throughout the reaction was 30 lb./sq. in. The resulting mixture of solid and liquid was poured over ice, diluted with 20 ml. of methyl alcohol, neutralized with dilute hydrochloric acid, and extracted with diethyl ether. The ether extract was washed once with water, dried, and distilled at atmospheric pressure to remove the bulk of the diethyl ether. The residue was distilled at a pressure of around 20 mm. of mercury into a solid carbon dioxide-acetone trap. The distillate was redistilled at 178 mm. to give 59.2 g. of a mixture of the methyl hemiacetal and hydrate of α-chloro-β-methoxy - α,β,β - trifluoropropionaldehyde, B.P. 58–78° C., $n_D^{24}=1.3979$.

*Step II.—Preparation of the Trifluoropropionaldehyde*

A stirred slurry of 25 g. of phosphorus pentoxide, $P_2O_5$, and 40 g. of a hydrate-hemiacetal mixture of α-chloro-β-methoxy - α,β,β - trifluoropropionaldehyde was heated at 60 to 70° C. for half an hour. The pressure was reduced and the crude aldehyde was distilled into a solid carbon dioxide-acetone trap. A second distillation freed the aldehyde from dark material which was carried over from the phosphorus pentoxide mixture. The 31.6 g. of distillate was redistilled in a spinning band column to give 29.3 g. of colorless liquid, B.P. 62° C./125 mm. This material was characterized as α-chloro-β-methoxy-α,β,β-trifluoropropionaldehyde by infrared analysis.

*Analysis.*—Calcd. for $C_4H_4O_2F_3Cl$: C, 27.22; H, 2.29; Cl, 20.09; F, 32.30. Found: C, 28.82; H, 2.63; Cl, 20.09; F, 32.40.

EXAMPLE VIII

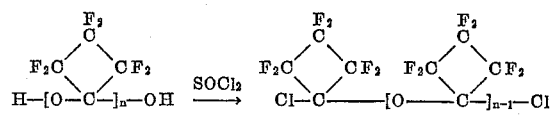

Five grams of perfluorocyclobutanone monomer (see U.S. Pat. 3,039,995) in 10 ml. of diethyl ether, dried over sodium, and 0.01 gram of sodium acetate were mixed and maintained for 10 minutes at 0° C. and then cooled to −80° C. Polymerization at −80° C. was immediately evidenced by the formation of an opaque gel. After two hours at −80° C., 2 cc. of thionyl chloride in 5 ml. of dry ether was added to the mixture at −80° C. and the gel broken up mechanically. After one hour at −80° C. the reaction mixture, protected from air, was permitted to warm overnight to room temperature and then heated to reflux. The solid polymeric product was collected by filtration and washed with petroleum ether, ether, alcohol, and water and dried at room temperature. The polymeric product decomposed only very slowly below 300° C. and moderately rapidly at 350–375° C. Polymer obtained in a polymerization in which the thionyl chloride after-treatment was omitted, showed rapid decomposition at temperatures in the neighborhood of 200–250° C.

[2] See Example II.

In similar experiments employing isolated polymer prepared in essentially similar polymerization systems, after treatment of the polymer with thionyl chloride in bulk at room temperature or in ether solution at room temperature gave comparable results.

EXAMPLE IX

Polymerization of perfluorocyclobutanone monomer was carried out in ether solution at −80° C. with 0.2% cesium fluoride and with 0.2% tetraethylammonium chloride, respectively. The polymers, without isolation, were treated for 30 minutes at −80° C. with a solution of 5 cc. of sulfuryl chloride in 10 cc. of diethyl ether, one hour at 0° C., and two hours at reflux. The polymers were isolated, washed, and dried as in Example VIII. The polymers obtained showed good thermal stability, decomposition being rapid only at 350–375° C. Polymer which had not received the sulfuryl chloride treatment decomposed rapidly at about 250° C.

EXAMPLE X

A sample of polyperfluorocyclobutanone prepared in diethyl ether at −80° C. with 0.2% cesium fluoride as initiator was treated with thionyl chloride for 30 minutes at −80° C., for one hour at 0° C., and for one hour at reflux. The product was isolated, as described in Example VIII. The treated polymer showed excellent thermal stability, decomposing only at 375–400° C. Analysis indicated 0.03% chlorine, which corresponds to a molecular weight of about 100,000.

A polyperfluorocyclobutanone prepared in ether at −80° C. with 0.2% sodium acetate as initiator decomposed rapidly at 275–300° C. and showed strong hydroxyl absorption in the infrared. After treatment with thionyl chloride for one hour at reflux, the thermal stability was improved so that it decomposed comparably rapidly only at 375° C. and above and showed no hydroxyl absorption in the infrared.

EXAMPLE XI

Two grams of polyperfluorocyclobutanone prepared as in Example X with sodium acetate as initiator was heated for eight hours at 100° C. in a pressure vessel with 20 cc. of carbon tetrachloride and 10 g. of sulfur tetrafluoride. The product was isolated, washed, and dried. The product thus obtained decomposed rapidly only at 375–400° C., while untreated polymer decomposed comparably rapidly at 250° C.

EXAMPLE XII

A sample of polyperfluorocyclobutanone prepared as in Example X with 0.2% sodium acetate as initiator decomposed rapidly on heating at 200° C. Five grams of the polymer was refluxed for two hours with five grams of phosphorus pentachloride in 25 cc. of carbon tetrachloride, isolated, washed, and dried. The treated polymer decomposed comparably rapidly only at about 325° C.

The halogen end group-containing polyperfluorocyclobutanone polymers prepared in accord with Examples VIII through XII are capable of being formed into films useful as wrapping materials, especially in applications where protection from attack by organic solvents is desired.

The new halogen end group-containing polymeric polyhaloacetals of this invention are useful in the formation of shaped objects, e.g., blocks, films, and fibers, by conventional polymer handling techniques, including solvent extrusion, coating or spinning or direct thermal conversion to shaped object. The products of this invention are also useful as packing material, stuffing box members, bearing, rod, and pump seals, etc. Such items may be fabricated by direct thermal means, including, melting, calendering, extrusion, and the like.

Since obvious modifications in the invention will occur to those skilled in the chemical art, I propose to be bound solely by the appended claims.

The embodiments of the invention in which an exclusive property or privilege is claimed are defined as follows:

1. The process for improving the thermal stability of a polymer of the formula

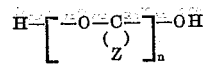

wherein (1) Z is at least one radical taken in sufficient number to satisfy the two free valences of its depicted carbon and is selected from the group consisting of hydrogen, monovalent polyfluorocarbon, ω-hydropolyfluorocarbon and β-alkoxypolyhalofluorocarbon, lower alkyl and divalent perfluorocarbon, with the proviso that not more than one radical in Z is from hydrogen and lower alkyl, and (2) n is an integer greater than 6, which comprises contacting said polymer at a temperature of up to 200° C. with a member of the group consisting of phosphorous and sulfur halides and oxyhalides and polyvalent metal halide Friedel-Crafts catalysts wherein all halogen is of atomic number 9 to 35.

2. The process of claim 1 accomplished in an inert organic reaction medium.

3. The process of claim 2 wherein the organic reaction medium is a chlorinated hydrocarbon.

4. The process of claim 2 wherein the organic reaction medium is an ether.

5. The process of claim 2 wherein the polymeric compound is polymeric ω-hydroperfluorovaleraldehyde.

6. The process of claim 2 wherein the polymeric compound is polymeric ω-hydrotetrafluoropropionaldehyde.

7. The process of claim 2 wherein the polymeric compound is polymeric difluoroacetaldehyde.

8. The process of claim 2 wherein the polymeric compound is polymeric β-methoxytetrafluoropropionaldehyde.

9. The process of claim 2 wherein the polymeric compound is polymeric perfluorocyclobutanone.

10. A polymer of the formula

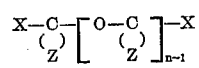

wherein (1) Z is at least one radical taken in sufficient number to satisfy the two free valences of its depicted carbon and is selected from the group consisting of hydrogen, monovalent polyfluorocarbon, ω-hydropolyfluorocarbon and β-alkoxypolyhalofluorocarbon, lower alkyl, and divalent perfluorocarbon, with the proviso that not more than one radical in Z is from hydrogen and lower alkyl, (2) X is selected from the group consisting of bromine, chlorine and fluorine, and (3) n is an integer greater than 6.

11. Polymeric ω-hydroperfluorovaleraldehyde in which the hydroxyl groups have been replaced by halogen of atomic number 9 to 35.

12. Polymeric ω-hydrotetrafluoropropionaldehyde in which the hydroxyl groups have been replaced by halogen of atomic number 9 to 35.

13. Polymeric difluoroacetaldehyde in which the hydroxyl groups have been replaced by halogen of atomic number 9 to 35.

14. Polymeric β-methoxytetrafluoropropionaldehyde in which the hydroxyl groups have been replaced by halogen of atomic number 9 to 35.

15. Polymeric perfluorocyclobutanone in which the hydroxyl groups have been replaced by halogen of atomic number 9 to 35.

16. A polymer of claim 10 in the form of a film.

17. The polymer of claim 11 in the form of a film.

18. The process of claim 2 wherein the polymeric compound is poly-β-ethoxytetrafluoropropionaldehyde.

19. The process of claim 2 wherein the polymeric compound is poly-β-n-butoxytetrafluoropropionaldehyde.

20. The process of claim 2 wherein the polymeric compound is polymeric α-chloro-β-methoxy-α,β,β-trifluoropropionaldehyde.

21. Poly-β-ethoxytetrafluoropropionaldehyde in which the hydroxyl groups have been replaced by halogen of atomic number 9 to 35.

22. Poly-β - n - butoxytetrafluoropropionaldehyde in which the hydroxyl groups have been replaced by halogen of atomic number 9 to 35.

23. Polymeric α-chloro-β-methoxy α,β,β-trifluoropropionaldehyde in which the hydroxyl groups have been replaced by halogen of atomic number 9 to 35.

24. The polymer of claim 15 in the form of a film.

References Cited in the file of this patent

UNITED STATES PATENTS

| 2,795,571 | Schneider | June 11, 1957 |
| 2,828,287 | Cairns et al. | Mar. 25, 1958 |

FOREIGN PATENTS

| 796,863 | Great Britain | June 18, 1958 |

OTHER REFERENCES

Richter: Textbook of Organic Chemistry, 2nd edition, Wiley Pub., New York, copyright 1943, pp. 67–70.

Chemical Abstracts, 1945, pages 5875–5951.

Walker: Formaldehyde, 2nd edition, A.C.S. Monograph Series, Reinhold Pub., New York, copyright 1953, page 197.